United States Patent
Pirchl

[11] Patent Number: 6,090,495
[45] Date of Patent: Jul. 18, 2000

[54] FLAT STRUCTURE MADE OF FOIL OR SHEET METAL TO BE USED AS A HEAT SHIELD

[75] Inventor: Gerhard Pirchl, Birrwil, Switzerland

[73] Assignee: Hecralmat, Liechtenstein

[21] Appl. No.: 08/875,949

[22] PCT Filed: Feb. 6, 1996

[86] PCT No.: PCT/EP96/00484

§ 371 Date: Sep. 23, 1997

§ 102(e) Date: Sep. 23, 1997

[87] PCT Pub. No.: WO96/24796

PCT Pub. Date: Aug. 15, 1996

[30] Foreign Application Priority Data

Feb. 8, 1995 [DE] Germany ........................ 195 04 063

[51] Int. Cl.[7] ........................................................ F16L 59/08
[52] U.S. Cl. ........................ 428/593; 428/603; 428/604; 72/196
[58] Field of Search ..................... 428/68, 593, 603, 428/604; 126/207; 72/196

[56] References Cited

U.S. PATENT DOCUMENTS

| | | | |
|---|---|---|---|
| 4,085,816 | 4/1978 | Amagai et al. | |
| 4,328,696 | 5/1982 | Gonwa et al. | |
| 5,167,060 | 12/1992 | Nawrocki et al. | 29/513 |
| 5,981,082 | 11/1999 | Pirchl | 428/603 |

FOREIGN PATENT DOCUMENTS

| | | | |
|---|---|---|---|
| 475800 | 5/1975 | Australia | B32B 3/28 |
| 2553713 | 4/1985 | France | B32B 3/12 |
| 2614396 | 10/1976 | Germany | F01N 7/14 |
| 2546857 | 4/1977 | Germany | B60J 9/00 |
| 2549722 | 5/1977 | Germany | B32B 3/12 |
| 2624634 | 12/1977 | Germany | F16L 59/08 |
| 2657276 | 6/1978 | Germany | F16L 59/08 |
| 3327659 | 2/1985 | Germany | F16L 59/02 |
| 3333591 | 3/1985 | Germany | F01N 7/14 |
| 3609029 | 10/1986 | Germany | F16L 59/02 |
| 8700918 | 4/1987 | Germany | B60R 13/08 |
| 8700921 | 4/1987 | Germany | B60R 13/08 |
| 3630399 | 3/1988 | Germany | F16L 59/14 |
| 8802317 | 5/1988 | Germany | F24D 19/00 |
| 9010136 | 10/1990 | Germany | F16L 59/00 |
| 9103864 | 11/1991 | Germany | F16L 59/06 |
| 4035177 | 5/1992 | Germany | B60R 13/08 |
| 4141855 | 6/1993 | Germany | E04B 1/74 |
| 4210691 | 7/1993 | Germany | B21D 39/02 |
| 4300817 | 7/1993 | Germany | F16L 59/02 |
| 4329411 | 5/1994 | Germany | F16L 59/02 |
| 4429104 | 2/1996 | Germany | F16L 59/02 |

*Primary Examiner*—Deborah Jones
*Assistant Examiner*—Jason Savage
*Attorney, Agent, or Firm*—Baker & Maxham

[57] ABSTRACT

A flat structure made of foil or sheet metal to be used as a heat shield, for example in motor vehicles in order to insulate the muffler against heat. The flat structure comprises at least one layer and is divided into a plurality of flat regions. Some of the flat regions are non-deformed and smooth and other flat regions are shaped from the plane of the non-deformed flat regions.

15 Claims, 2 Drawing Sheets

FLAT STRUCTURE MADE OF FOIL OR SHEET METAL TO BE USED AS A HEAT SHIELD

BACKGROUND OF THE INVENTION

1. Field of the Invention

The invention concerns a flat structure made of sheet metal, foil or layers of foil for use as heat shields such as those used for between the muffler of a motor vehicle and other adjacent parts.

2. Description of Prior Art

German patent 9,103,864 discloses a heat shield of the general type which is the subject of the present invention. It describes a mat consisting of several layers of shaped foil, where these foil layers are arranged in parallel and at a spacing relative to each other. The layers are attached to a sheet metal part with appropriate fastening devices in such a way as to form a heat shield. With this known mat, each layer of the foil is deformed to prevent direct surface contact with each adjacent layer. The degree of thermal insulation of such a mat is greatly impaired, however, because due to the deformation of all mats, incident radiant heat is reflected repeatedly on the deformations, and the foil layers heat up due to transverse reflections, so that the resulting degree of thermal insulation is relatively unfavorable. Furthermore, it is regarded as a disadvantage that several mat layers must be used to achieve such an insulation effect.

SUMMARY OF THE INVENTION

A primary purpose of the present invention is to achieve a desired degree of thermal insulation with at least a single mat layer. Accordingly, an object of this invention is to improve on flat structures of the prior art so that a highly effective heat shield can be created at a much lower cost.

An important feature of the present invention is that it has a flat structure which consists of a foil or a sheet metal, where the foil is about 0.4 mm thick and the sheet metal which may also be used is about 0.4 mm thick.

The inventive concept of the present invention also includes several parallel shaped flat structures stacked one atop the other or a combination of foil structures with sheet metal structures. This invention incorporates and improves upon the layer arrangements of the prior art.

For reasons of simplicity, the following detailed description describes only the shaping of a single flat structure, which may be designed as either a foil or as sheet metal, although there may also be several parallel flat structures, as stated above.

According to this invention, the flat structure is given a three-dimensional structure, thus forming shaped areas that form shaped surfaces of straight radiant surfaces projecting out of the plane of the unshaped flat structure, and these radiant surfaces are in turn as unshaped as possible and have favorable reflection properties. An important part of the present invention is thus that at least one shaped flat structure is used to produce such a heat shield, and shaped surfaces that project out of the plane of the unshaped surface are created in this flat structure, where the projecting surfaces are to be designed as reflective or mirror surfaces. These surfaces should have optimum reflection properties and should reflect incident radiant heat back in the same direction if possible.

The intermediate shaped surfaces serve only to permit three-dimensional shaping of this flat structure without the straight unshaped surfaces being bent and deformed themselves. Thus the mirror properties of the areas that project out of the surface should be maintained and retained as much as possible, while the other areas are shaped in an intentional and controlled manner to permit three-dimensional shaping of this flat structure for the purpose of producing a heat shield. Thus, by applying shaped surfaces, predetermined bending lines and predetermined bending surfaces are created, premitting controlled bending of this flat structure only in this area, while the outside areas must be unshaped and should have optimum reflection properties.

It is important here for the three-dimensional bending of this flat structure in the direction of the heat source to be designed so that the grooves formed in the vicinity of the shaped surfaces will close when shaping the flat structure to thereby be able to present the largest possible unshaped reflective surface to the heat source. The shaped surfaces should thus be kept as small as possible in the direction of the heat source, while the unshaped reflective surfaces should be maintained as large as possible.

Different embodiments are described here for producing such a flat structure. The mirror surfaces or reflective surfaces may be shaped in an approximately rectangular shape out of the unshaped foil or the unshaped sheet metal; instead of rectangular surfaces, it is equally possible to shape hexagonal surfaces, ellipsoidal surfaces, round surfaces, oval surfaces, square surfaces, grooved surfaces, etc., out of the plane, always with the goal of designing the surfaces shaped out of the plane to have a smooth unshaped surface as much as possible, to create optimum reflection properties.

The inventive concept of the present invention includes the situation where the shaped surface projecting out of the plane of the unshaped foil or the unshaped sheet metal is provided not only on one side but is also on both sides (front and back sides) to create a flat structure with shapes projecting out of it on both sides.

It is important at any rate that with the controlled application of shaped surfaces, predetermined bending surfaces are created, in the vicinity of which the flat structure can be bent in a controlled manner, while the other shaped surfaces should retain their optimum reflection properties.

Such a foil or sheet metal structure preferably consists of sheet aluminum or aluminum foil, but it may also consist of galvanized or aluminized steel plate, or plastic which has been coated appropriately with suitable coating surfaces having the desired reflection properties.

As indicated above, the flat structure may be not only a one-layer structure, but it may also consist of several layers arranged parallel to each other in the manner of a mat. Moreover, the advantage when using a single-layer flat structure or even a multi-layer flat structure is that optimum sound insulation properties are achieved, because sound is absorbed by the application of controlled bending areas and the vibration response is attenuated significantly.

BRIEF DESCRIPTION OF THE DRAWING

The objects, advantages, and features of the invention will be more readily perceived from the following detailed description, when read in conjunction with accompanying drawing, in which.

DESCRIPTION OF THE PREFERRED EMBODIMENTS

Figure 1:
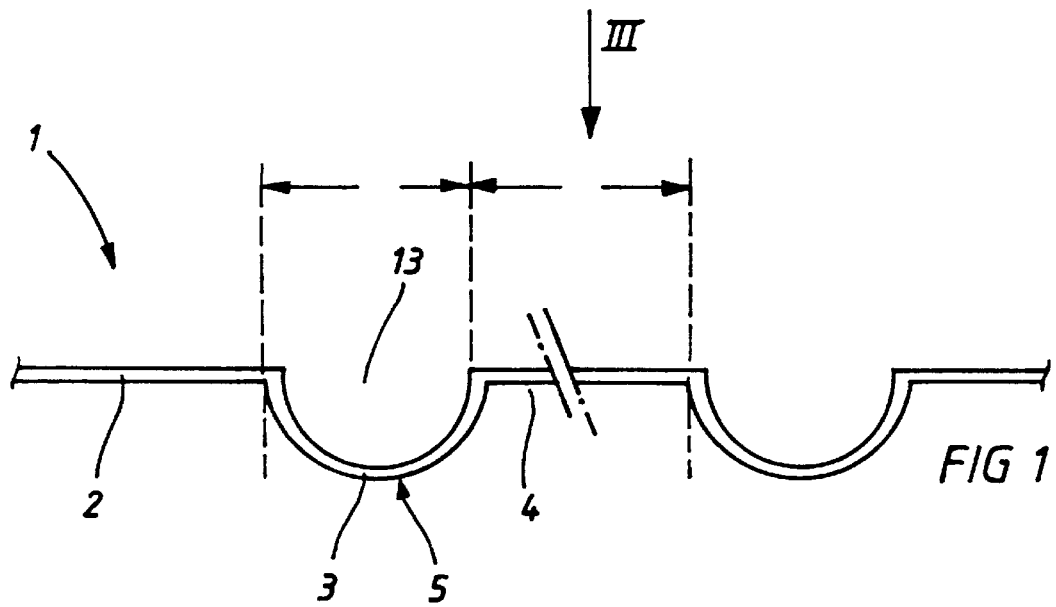
FIG. 1 is a sectional view through a first embodiment of a flat structure constructed according to the invention.

In FIG. 1, flat structure 1 consists of smooth unshaped surfaces 2 and shaped surfaces 3 which form smooth unshaped intermediate areas 4 between them. In the embodiment illustrated here, shaped surfaces 3 form radial surfaces 5 that project out of the plane of unshaped surfaces 2.

Figure 2:
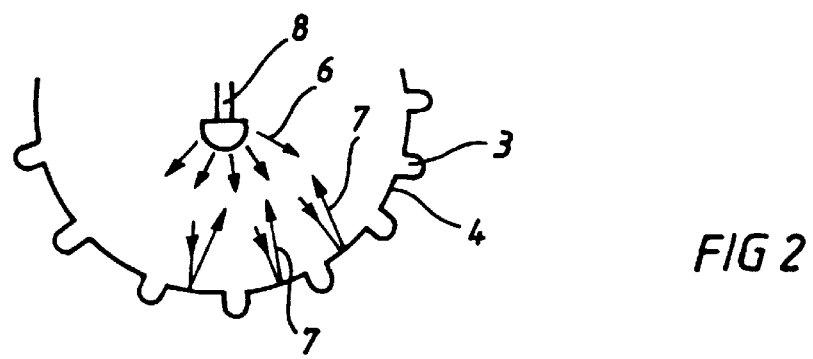
FIG. 2 is an enlarged sectional view through the flat structure of FIG. 1 in the shaped condition.

A schematic diagram of an application of such a flat structure 1 is shown in FIG. 2, where heat source 8 emits radiant heat in the direction of arrows 6, and the heat is reflected back on the smooth intermediate areas 4 in the direction of arrows 7.

Figure 3:
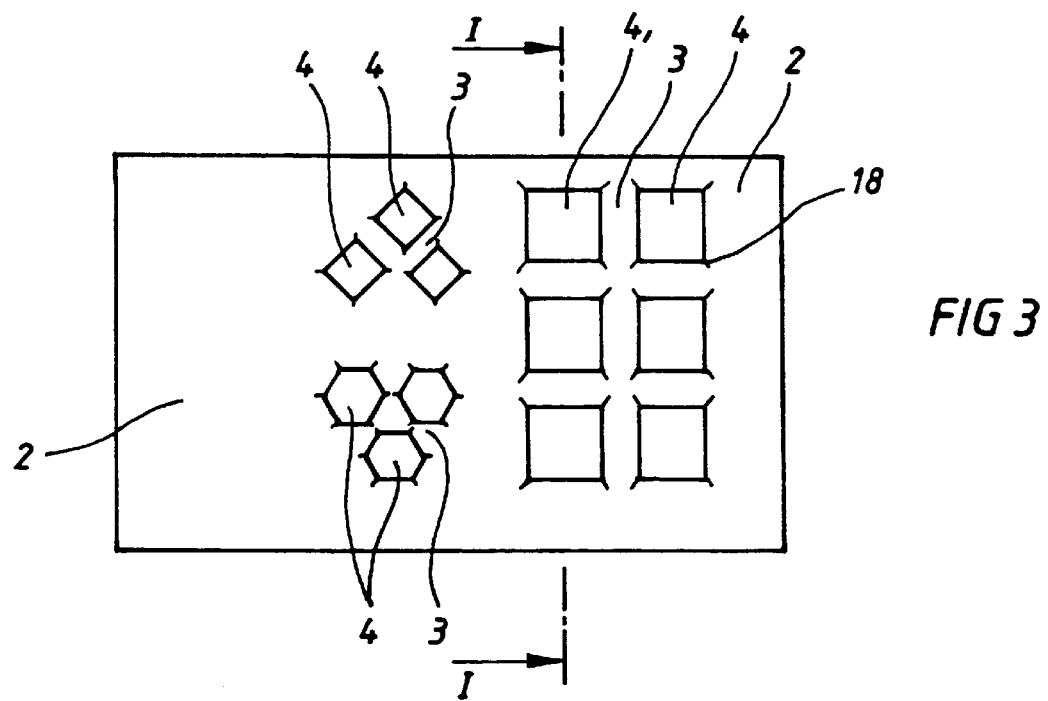
FIG. 3 is a top view of different embodiments of the flat structure taken in the direction of arrow III in FIG. 1.

FIG. 3 shows various embodiments, where it can be seen that intermediate areas 4 lie in the plane of unshaped surfaces 2 (when looking in the direction of arrow III in FIG. 1) and shaped surfaces 3 are then recessed (downward) out of the plane of surfaces 2 and 4. Intermediate areas 4 form the above-mentioned large-area, smooth, unshaped reflective surfaces which are configured to reflect the radiant heat back in the direction of arrows 7 to the heat source 8 in an optimized manner.

In addition, FIG. 3 shows that the unshaped intermediate areas 4 may also be in the form of rhomboids or squares, where shaped intermediate areas 3 are provided, and likewise, there may also be hexagonal intermediate areas 4 between which there are downwardly recessed shaped areas 3.

Figure 4:
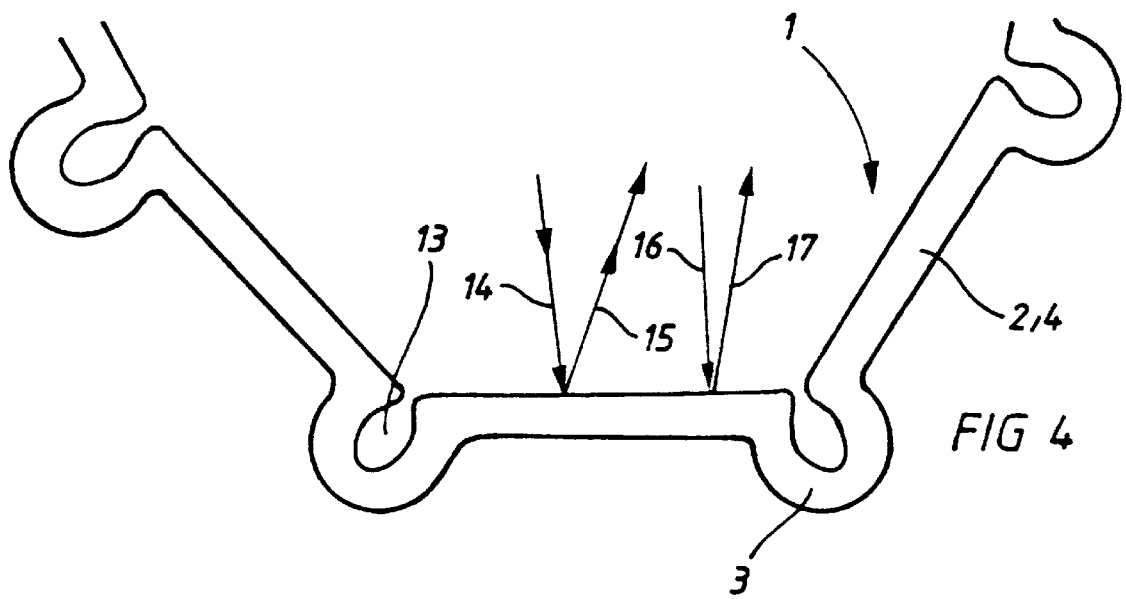
FIG. 4 is a partial enlarged sectional view through the shaped flat structure shown in FIG. 2.

An enlarged diagram of a portion of the structure of FIG. 2 is represented in FIG. 4. Here it can be seen that intermediate areas 4 between the shaped areas have smooth surfaces and reflect radiant heat 14 back in the direction of arrow 15 in an optimum manner. In a similar manner, heat 16 is reflected back in the direction of arrow 17. It can also be seen from FIG. 4 that shaped areas 3 practically form grooves 13 which are open on one side and are closed in three-dimensional shaping of flat structure 1, thus presenting only small, nonreflective areas to the heat source. FIG. 4 also shows that the flat structure of the invention may be comprised of more than one layer.

Figure 5:
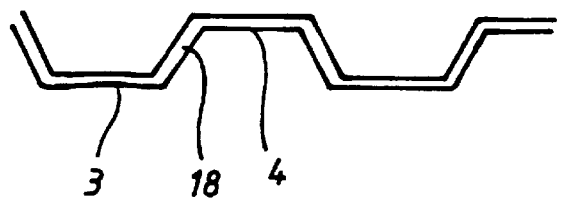
FIG. 5 is a sectional view through an alternative embodiment of a flat structure according to the invention.

An alternative embodiment with a hexagonal shaping of the surface appears in FIG. 5 and is shown on the basis of the example in FIG. 3. It can be seen here that there are intermediate areas 4 that are opposite the heat source and inclined transitions 18 are formed between areas 3 and 4 that are approximately trapezoidal.

Figure 6:
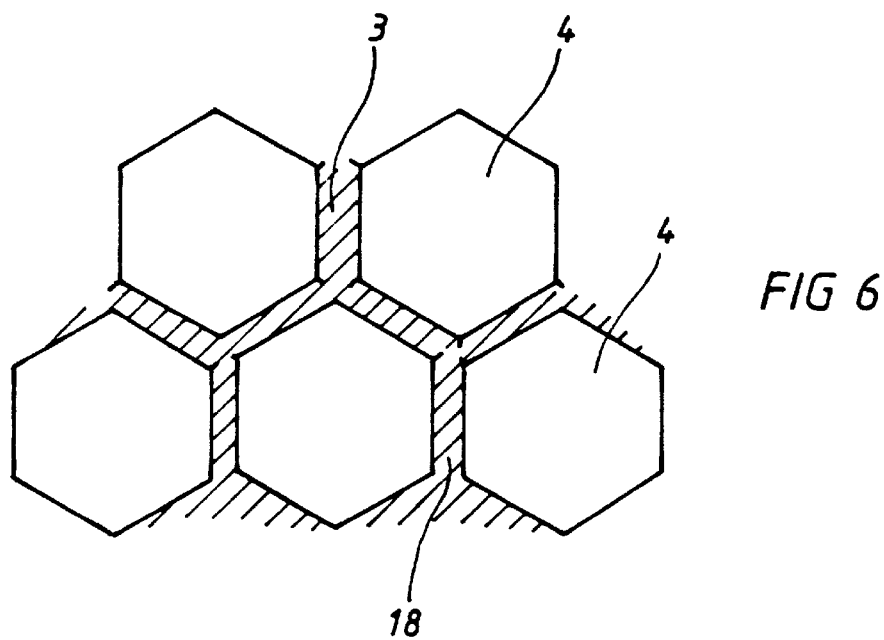
FIG. 6 is a top view of the flat structure of FIG. 5.

FIG. 6 shows greater detail of the FIG. 5 embodiment, where smooth surfaces 4 facing the heat source can be seen, with the smallest possible surfaces 3 provided between them.

In view of the above description it is likely that modifications and improvements will occur to those skilled in the applicable technical field which are within the spirit and scope of the appended claims. For example, the flat structure heat shield of the invention may have a thickness of about 0.4 mm. Where the heat shield is formed of layers of foil, each layer may have a thickness of about 0.4 mm or the entire flat structure comprised of more than one layer may have a composite thickness of about 0.4 mm. Typically, each layer of a composite structure would be no more that about 0.4 mm thick and the composite flat structure would be at least about 0.4 mm thick.

What is claimed is:

1. A structure of sheet material for use as a heat shield for a heat source, said structure comprising:

at least one sheet having a smooth surface, said surface comprising a plurality of substantially planar surface areas and at least one groove, said substantially planar surface areas being formed out of the smooth, unshaped surface areas of said sheet, said groove being generally U-shaped, and at least said substantially planar surface areas being formed with strong reflective properties for radiant heat;

said structure being configured to be bent to at least partially enclose the heat source that is to be shielded, the groove being structured such that the bending occurs only in said groove and such that the bending at least partially closes the generally U-shaped groove.

2. The structure according to claim 1, wherein said sheet comprises several parallel layers of sheet metal and/or foil.

3. The structure according to claim 1, wherein one or more layers of said structure is comprised of foil having a thickness of up to about 0.4 mm.

4. The structure according to claim 2, wherein one or more layers of said structure is comprised of foil having a thickness of up to about 0.4 mm.

5. The structure according to claim 1, wherein one or more layers of said structure is comprised of sheet metal with a thickness of at least about 0.4 mm.

6. The structure according to claim 2, wherein one or more layers of said structure is comprised of sheet metal with a thickness of at least about 0.4 mm.

7. The structure according to claim 3, wherein one or more layers of said structure is comprised of sheet metal with a thickness of at least about 0.4 mm.

8. The structure according to claim 4, wherein one or more layers of said structure is comprised of sheet metal with a thickness of at least about 0.4 mm.

9. A heat shield comprising:

a plurality of planar areas comprised of a heat-reflective material; and a groove, with the groove adjacent to at least two planar areas and substantially extending on only one side of planes defined by the at least two adjacent substantially planar areas, the groove being structured and located so that when the heat shield is bent, the groove will deform to allow the bending, while each of the plurality of planar areas will remain substantially planar in the vicinity of the bending.

10. The heat shield according to claim 9, wherein a surface area of the planar areas is large relative to a surface area of the groove.

11. The heat shield according to claim 9, wherein the planar areas and the groove are formed from a unitary sheet of heat-reflective material.

12. The heat shield according to claim 11, wherein the groove is generally U-shaped.

13. A heat shield comprising:

a plurality of first planar areas comprised of heat reflective material with the first planar areas each being substantially planar defining and collectively being substantially co-planar with a first plane;

a plurality of second planar areas comprised of heat reflective material with the second planar areas each being substantially planar and collectively being substantially co-planar with a second plane, wherein the second plane is different than the first plane; and at least one transition area with the transition area being located between the first and second planar areas, said transition area being deformable to allow bending such that each first planar area and each second planar area remains substantially planar.

14. The heat shield of claim 13 wherein the plurality of first planar areas, the plurality of second planar areas, and the transition area are formed of a unitary sheet of material.

15. The heat shield of claim 13 wherein each first planar area and each second planar area are generally hexagonal in shape.

* * * * *